United States Patent
Chien et al.

(10) Patent No.: US 12,287,505 B1
(45) Date of Patent: Apr. 29, 2025

(54) DISPLAY DEVICE

(71) Applicant: CHAMP VISION DISPLAY INC., Miao-Li County (TW)

(72) Inventors: Wei-Jhe Chien, Miao-Li County (TW); Chung-Hao Wu, Miao-Li County (TW); Chun-Chien Liao, Miao-Li County (TW); Chun-Chung Hsiao, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/402,771

(22) Filed: Jan. 3, 2024

(51) Int. Cl.
*F21V 8/00* (2006.01)
*G02F 1/1335* (2006.01)

(52) U.S. Cl.
CPC ..... *G02B 6/0036* (2013.01); *G02F 1/133524* (2013.01); *G02F 1/133607* (2021.01); *G02F 1/133616* (2021.01)

(58) Field of Classification Search
CPC .......... G02B 6/0036; G02F 1/133607; G02F 1/133616
See application file for complete search history.

(56) References Cited

U.S. PATENT DOCUMENTS

| | | | |
|---|---|---|---|
| 2004/0246698 A1* | 12/2004 | Shimizu | G02B 6/0036 362/603 |
| 2015/0185394 A1* | 7/2015 | Huang | G02B 6/0028 362/610 |
| 2015/0338565 A1* | 11/2015 | Pao | G02B 6/0036 362/606 |
| 2021/0333826 A1* | 10/2021 | Liao | G02B 6/0068 |
| 2024/0192434 A1* | 6/2024 | Lee | G02B 6/0068 |

FOREIGN PATENT DOCUMENTS

| | | |
|---|---|---|
| CN | 112113166 A | 12/2020 |
| CN | 114278894 A | 4/2022 |
| CN | 218544118 U | 2/2023 |
| TW | 200823405 A | 6/2008 |
| TW | 202206863 A | 2/2022 |
| TW | 202219425 A | 5/2022 |
| TW | M634734 U | 12/2022 |
| TW | 202314342 A | 4/2023 |
| TW | 1854862 B | 9/2024 |
| WO | 2011118536 A1 | 9/2011 |

* cited by examiner

*Primary Examiner* — Keith G. Delahoussaye (57) ABSTRACT

A display device includes a display element, a light guide plate, and a light-emitting element. The display element has a display side and a back side, and the display side is opposite to the back side. The light guide plate is disposed on the display side. The light guide plate has a light-emitting surface, a light-incident surface, and a surface. The light-emitting surface faces away from the display side. The surface faces toward the display side. The surface has a plurality of optical microstructures, and the light-incident surface is located between the light-emitting surface and the surface. The light-emitting element is disposed opposite to the light-incident surface.

13 Claims, 13 Drawing Sheets

DISPLAY DEVICE

FIELD OF THE INVENTION

The invention relates to a light-emitting device, and more particularly to a display device.

BACKGROUND OF THE INVENTION

The illumination device such as a desk lamp, a floor lamp, and a computer monitor lamp have been widely used in daily life. For example, the computer monitor lamp is usually fixed at a top of the monitor, to illuminate the desktop where the monitor is placed.

However, there are still a lot of defects for a conventional computer monitor lamp. Firstly, a wire is needed for electrically connecting the computer monitor lamp to the monitor for receiving electric power, so it is required to sort the additional wire. In addition, the light with high brightness emitted by the computer monitor lamp may be transmitted to the eyes of user, and therefore causing the user feel uncomfortable due to glare.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE INVENTION

The invention provides a display device, which can illuminate a desktop as a computer monitor lamp does and can also to reduce the problem of glare.

Other advantages and objects of the invention may be further illustrated by the technical features broadly embodied and described as follows.

In order to achieve one or a portion of or all of the objects or other objects, an embodiment of the invention provides a display device including a display element, a light guide plate, and a light-emitting element. The display element has a display side and a back side, and the display side is opposite to the back side. The light guide plate is disposed on the display side. The light guide plate has a light-emitting surface, a light-incident surface, and a surface. The light-emitting surface faces away from the display side. The surface faces toward the display side. The surface has a plurality of optical microstructures, and the light-incident surface is located between the light-emitting surface and the surface. The light-emitting element is disposed opposite to the light-incident surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
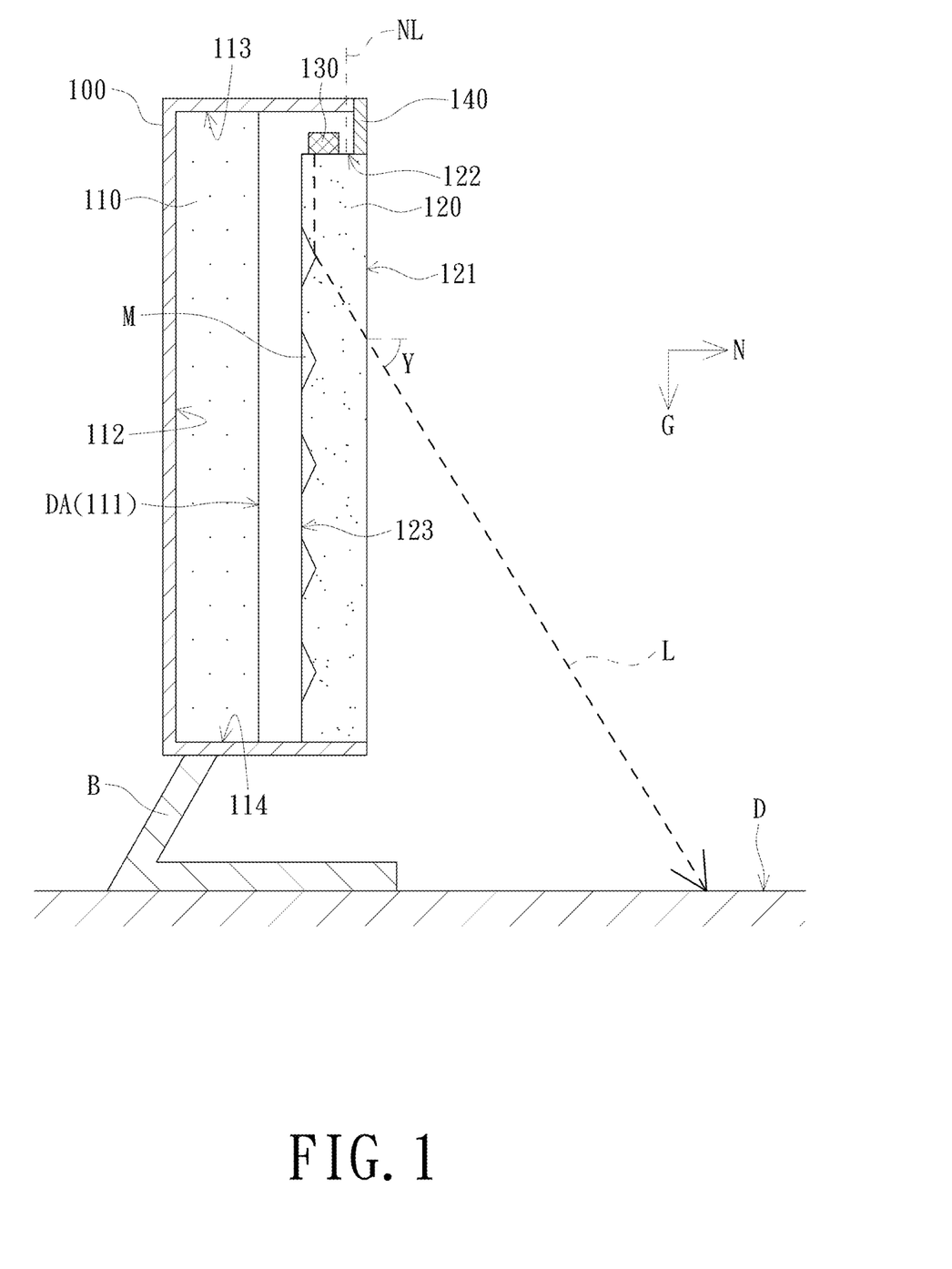
FIG. 1 is a schematic cross-sectional diagram of a display device according to an embodiment of the present invention.
Figure 2:
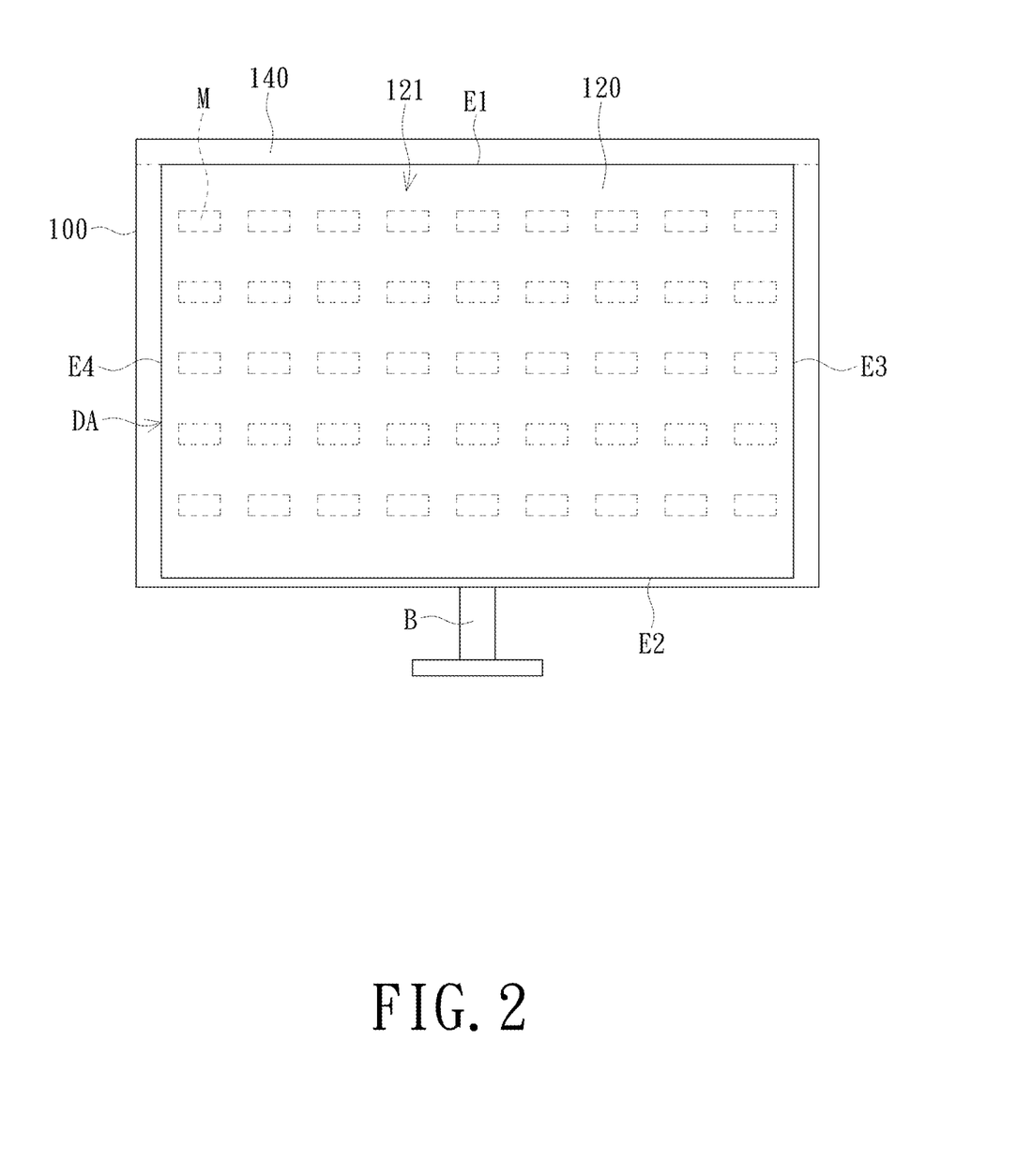
FIG. 2 is a schematic diagram of the display side of the display element of the display device shown in FIG. 1 of the present invention.

FIG. 1 is a schematic cross-sectional diagram of a display device according to an embodiment of the present invention. FIG. 2 is a schematic diagram of the display side of the display element of the display device shown in FIG. 1 of the present invention. Please refer to FIGS. 1 and 2. A display device 100 includes a display element 110, a light guide plate 120, and a light-emitting element 130. The display element 110 has a display side 111 and a back side 112, and the display side 111 is opposite to the back side 112. The light guide plate 120 is disposed on the display side 111. The light guide plate 120 has a light-emitting surface 121, a light-incident surface 122, and a surface 123. The light-emitting surface 121 faces away from the display side 111. The surface 123 faces toward the display side 111. The surface 123 has a plurality of optical microstructures M, and the light-incident surface 122 is located between the light-emitting surface 121 and the surface 123. The light-emitting element 130 is disposed opposite to the light-incident surface 122.

The display element 110 may be a liquid crystal display element, but the invention is not limited thereto. In the embodiment, the display side 111 has a display area DA. The display area DA is covered by the light guide plate 120, and the surface 123 faces to the display area DA. Specifically, the display area DA can be a screen of the display element 110 to form an image. It should be noted that the display device 100 is not a reflective display in the embodiment. In other words, the light L emitted by the light-emitting element 130 is unable to form the image on the display area DA of the display element 110. Also, the light guide plate 120 can guide the light L emitted by light-emitting element 130 to illuminate a desktop D where the display element 110 is placed, rather than forming the image on the display area DA.

On the other hand, the display device 100 can further include a light-shading element 140. The display element 110 further has a first side 113 and a second side 114. The first side 113 and the second side 114 are opposite to each other, and the display side 111 and the back side 112 are located between the first side 113 and the second side 114. The light-shading element 140 is disposed on the display side 111, and the light-shading element 140 is closer to the first side 113 than the second side 114. The display area DA is located between the light-shading element 140 and the second side 114. For example, the light-shading element 140 may be a part of a frame around the display area DA.

It is worth mentioning that the light-emitting element 130 is disposed between the light guide plate 120 and the first side 113, and the light-emitting element 130 is covered by the light-shading element 140. Therefore, the light-shading element 140 is able to block the light L that could have been directly transmitted to the user's eyes, thereby further reducing the problem of glare. Specifically, the light-emitting element 130 can be covered by the light-shading element 140 in a normal direction N of the light-emitting surface 121. The light-emitting element 130 may include a LED in the embodiment, but other embodiments are not limited thereto. Additionally, a plurality of light-emitting elements 130 can be disposed on the light-incident surface 122 in the embodiment. For example, the light-emitting elements 130 may be arranged as a line on the light-incident surface 122.

Incidentally, a normal line NL of the light-incident surface 122 is, for example, parallel to a direction of gravity G. Thus, the light L emitted by the light-emitting element 130 may approximately reach the optical microstructures M along the direction of gravity G, thereby illuminating the desktop D along a diagonally-downward direction between the normal direction N and the direction of gravity G. Particularly, a base B may be connected to the second side 114 of the display element 110 opposite to the first side 113 where the light-emitting element 130 is disposed. It is understood that an angle between the normal line NL and the direction of gravity G can be greater than 0° in one embodiment. For example, the angle between the normal line NL and the direction of gravity G can range from 1° to 30°, but the invention is not limited thereto. It should be noted that the display device 100 in the embodiment is, for example, a desktop display device, and the base B in the embodiment is, for example, located between the display device 100 and the desktop D.

The light guide plate 120 may be fixed to the display side 111 in the embodiment. For example, the light guide plate 120 may be fixed to the frame. Also, the display area DA can be covered by the light guide plate 120. The display area DA has a first edge E1, a second edge E2, a third edge E3, and a fourth edge E4. The first edge E1 is opposite to the second edge E2. The third edge E3 and the fourth edge E4 are located between the first edge E1 and the second edge E2. The third edge E3 is opposite to the fourth edge E4. For example, the second edge E2 is adjacent to the base B. A distribution area of the optical microstructures M on the surface 123 can extend from the first edge E1 to the second edge E2, and the distribution area can further extend from the third edge E3 to the fourth edge E4. In short, the display area DA may be completely (or almost completely) covered by the light guide plate 120 in the normal direction N, and the optical microstructures M can be distributed uniformly on the surface 123. On the other hand, the optical microstructures M can be slightly separated from the first edge E1, the second edge E2, the third edge E3, and the fourth edge E4. In other words, the optical microstructures M may not be disposed in the area of the display area DA adjacent to the first edge E1, the second edge E2, the third edge E3, and the fourth edge E4.

Figure 3:
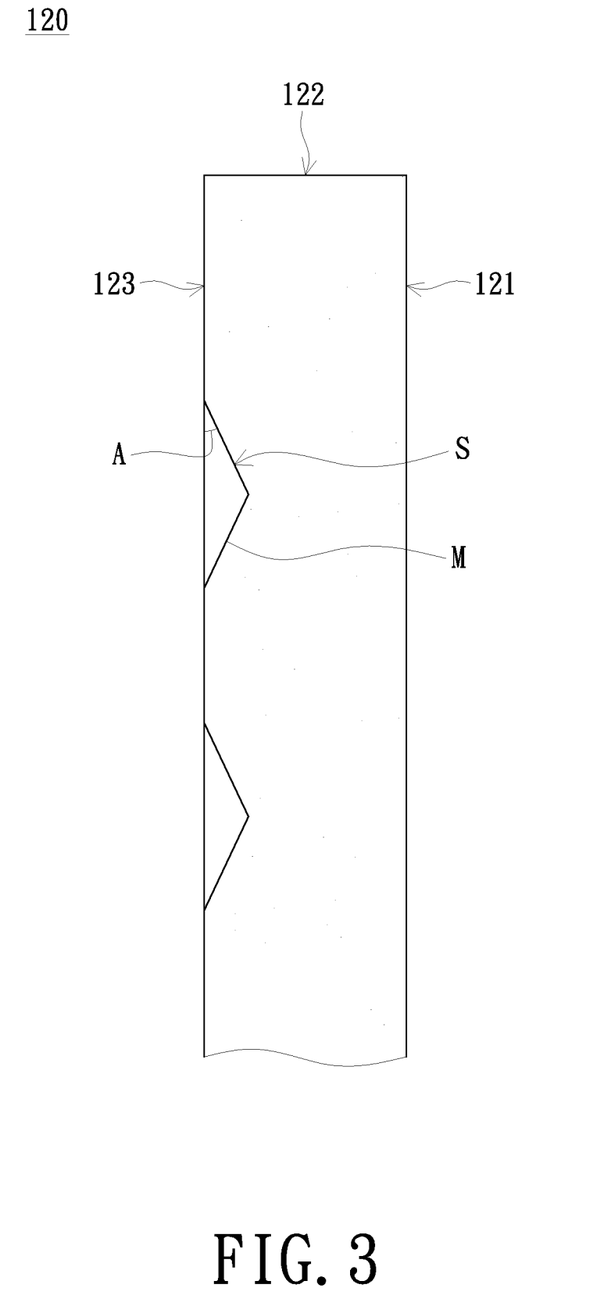
FIG. 3 is a schematic cross-sectional diagram of a part of the light guide plate of the display device shown in FIG. 1 of the present invention.

FIG. 3 is a schematic cross-sectional diagram of a part of the light guide plate of the display device shown in FIG. 1 of the present invention. Please refer to FIGS. 1 and 3. The optical microstructures M can be recessed from the surface 123 in the embodiment. Each of the optical microstructures M has an optical surface S and an included angle A, and the optical surfaces S face toward the light-incident surface 122. Each of the included angles A is formed between the surface 123 and the respective optical surface S. Specifically, the optical surfaces S face toward the light-incident surface 122. Thus, after the light L enters the light guide plate 120 through the light-incident surface 122, most of the light L is transmitted to and reflected by the optical surfaces S. Thus, an angle Y where the light L is emitted from the light-emitting surface 121 can be adjusted by changing a degree of each of the included angles A. For example, the refractive index of the light guide plate 120 is indicated as "n". In one embodiment, a relationship between the included angle A, the angle Y, and the refractive index n can be expressed as:

$$Y=\sin^{-1}(n*\sin(90°-2*A)) \quad (1).$$

Figure 4:
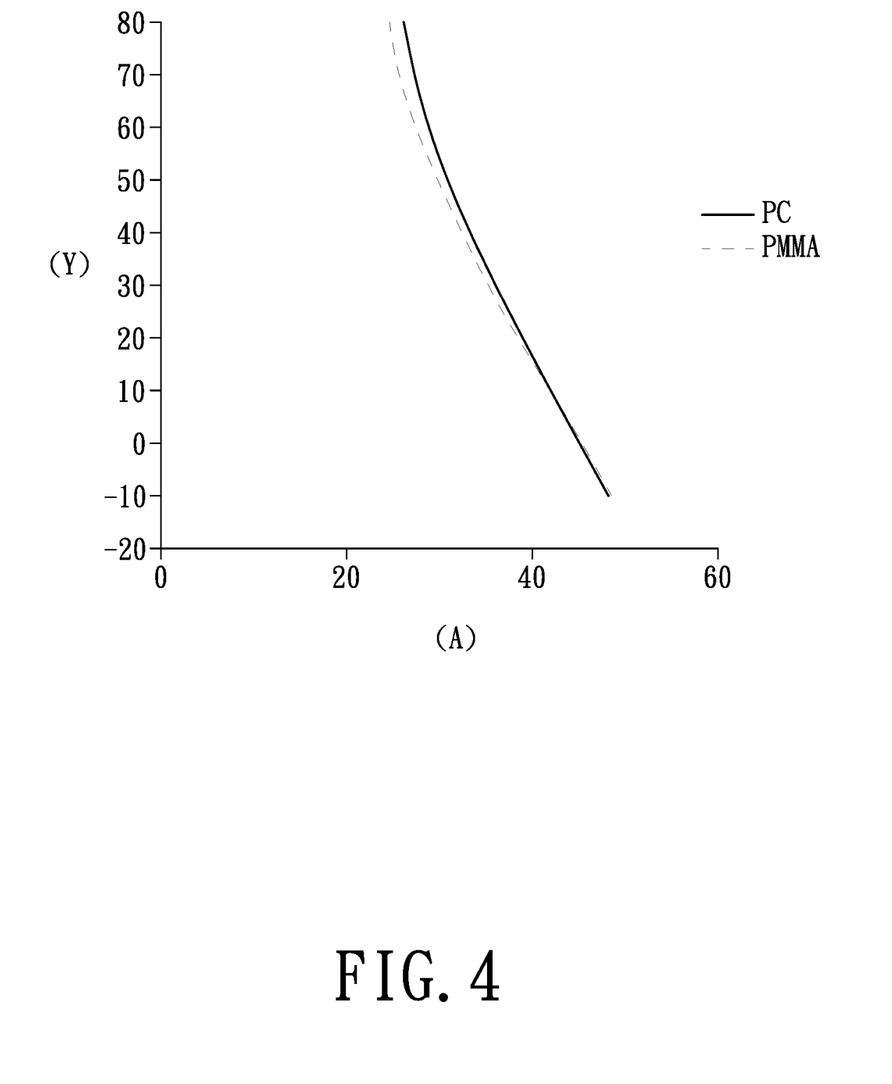
FIG. 4 is a schematic diagram of the relationship between the angle of the light emitted from the light-emitting surface and the included angle of the optical microstructure shown in FIG. 1 of the present invention.

FIG. 4 is a schematic diagram of the relationship between the angle of the light emitted from the light-emitting surface and the included angle of the optical microstructure shown in FIG. 1 of the present invention. Please refer to FIG. 4. The relationship (1) for materials of PC (Polycarbonate) and PMMA (Polymethyl methacrylate) are similar to a linear formula: Y=−3.55*A+158.53. Hence, the relationship (1) is suitable for determining the angle A based on the angle Y for different materials.

Figure 5:
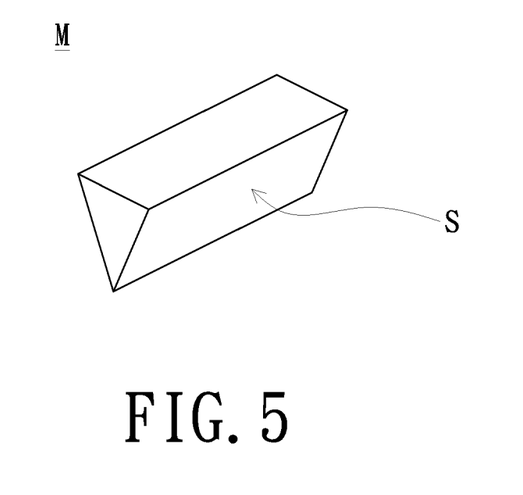
FIG. 5 is a schematic diagram of the optical microstructure of the light guide plate shown in FIG. 1 of the present invention.

FIG. 5 is a schematic diagram of the optical microstructure of the light guide plate shown in FIG. 1 of the present invention. Please refer to FIG. 3 again first. Each of the included angles A can have the same degree in the embodiment. For example, the degree of each of the included angles A may be determined by the relationship (1) based on the required angle Y (shown in FIG. 1). Then, please refer to FIGS. 3 and 5 together. Each of the optical microstructures M is, for example, in a shape of a triangular prism. Particularly, the optical surface S can be a surface of the triangular prism inclined relative to and adjoined to the surface 123 of the light guide plate 120. On the other hand, each of the optical surfaces S includes, for example, a flat surface. However, the optical surfaces S may include curved surfaces in one embodiment, and the curved surfaces can be convex surfaces or concave curved surfaces. It should be further explained that the optical microstructures M may be cylindrical structures with a polygonal cross-section in another embodiment.

Figure 6:
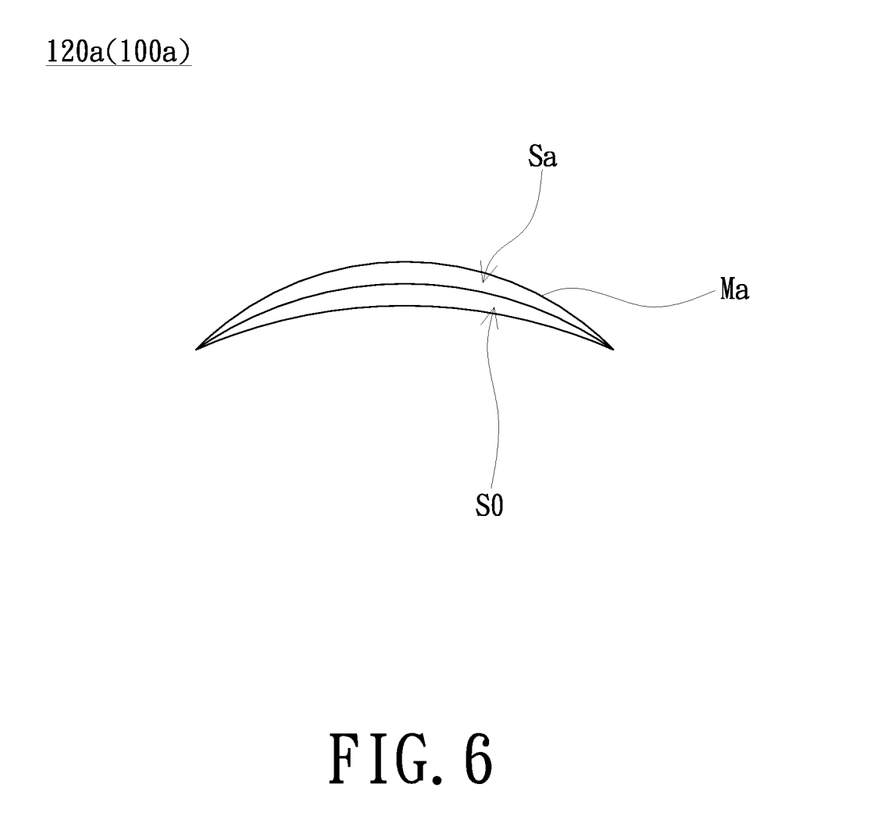
FIG. 6 is a schematic top view of an optical microstructure of a display device according to another embodiment of the present invention.
Figure 7:
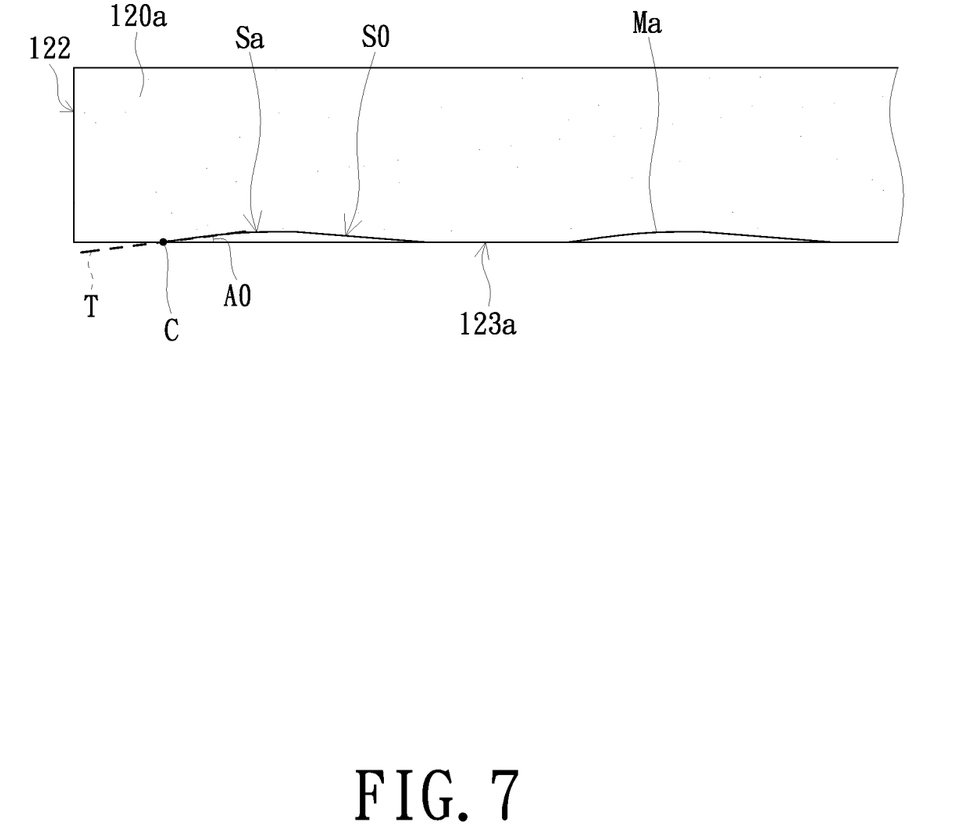
FIG. 7 is a schematic cross-sectional diagram of a part of the light guide plate of the display device shown in FIG. 6 of the present invention.

FIG. 6 is a schematic top view of an optical microstructure of a display device according to another embodiment of the present invention. FIG. 7 is a schematic cross-sectional diagram of a part of the light guide plate of the display device shown in FIG. 6 of the present invention. Incidentally, the optical microstructures M are not limited to the triangular prisms. For example, please refer to the display device 100a shown in FIGS. 6 and 7. Each of the optical microstructures Ma of the light guide plate 120a may be in a crescent shape. Also, each of the optical surfaces Sa may include a curved surface. Particularly, the optical surface Sa is provided with a convex side of the optical microstructure Ma, and the optical surface Sa may be a convex surface. Additionally, the surface SO facing away from the light-incident surface 122 may be a concave curved surface. However, the optical surface Sa may be a concave curved surface, and the surface SO may be a convex surface in one embodiment. Also, both of the optical surface Sa and the surface SO may be concave curved surfaces or convex surfaces in another embodiment. Moreover, at least one of the optical surface Sa and the surface SO may be a flat surface SO in still another embodiment. It should be noted that the included angle A0 may be formed between a tangent plane T passing through a cross line C adjoined by the surface 123a and the optical surface Sa in the embodiment.

Compared with the prior art, the display device 100 of the embodiment is provided with the light guide plate 120 having the optical microstructures M. Particularly, the light L emitted by the light-emitting element 130 is reflected by the optical microstructures M so the light L can be emitted from the light-emitting surface 121 in the diagonally-downward direction away from the normal direction N of the light-emitting surface 121. Hence, before reaching the desktop D, the light L has been reflected at least one time by the optical microstructures M and therefore the brightness of the light L reflected to the eyes of the user can be reduced. Furthermore, by reflecting the light L through the optical microstructure M, the light L can be prevented from directly entering the eyes of the user, and the light L can be guided to the appropriate position. Also, because the light-emitting element 130 is able to be electrically connected to the display element 110 without a wire and the display device 100 is able to illuminate the desktop D without requiring an additional computer monitor lamp, the display device 100 can have a simple structure. For these reasons, the display device 100 of the embodiment is able to illuminate the desktop D as a computer monitor lamp does with a simpler structure, and also able to reduce the problem of glare.

It is understood that the use of the display device 100 is not only for the computer monitor lamp as FIG. 1 shows. Please refer to FIG. 1 again. For example, the display device 100 can be disposed in a vehicle. In prior art, most of vehicles only provide with a lamp at the top. Hence, when a person reads something below the lamp in the vehicle, the light emitted by the lamp may be blocked by the body or the head of the person. However, because the display device 100 in the embodiment is provided with the illumination function and the display device 100 can be fixed to a position facing the person in the vehicle, the light L emitted by the display device 100 can be directly transmitted to the document or book that the person is reading without being blocked by the body or the head of the person. Thus, it is convenient for the person to read something in the vehicle without requiring an additional lamp.

Figure 8:
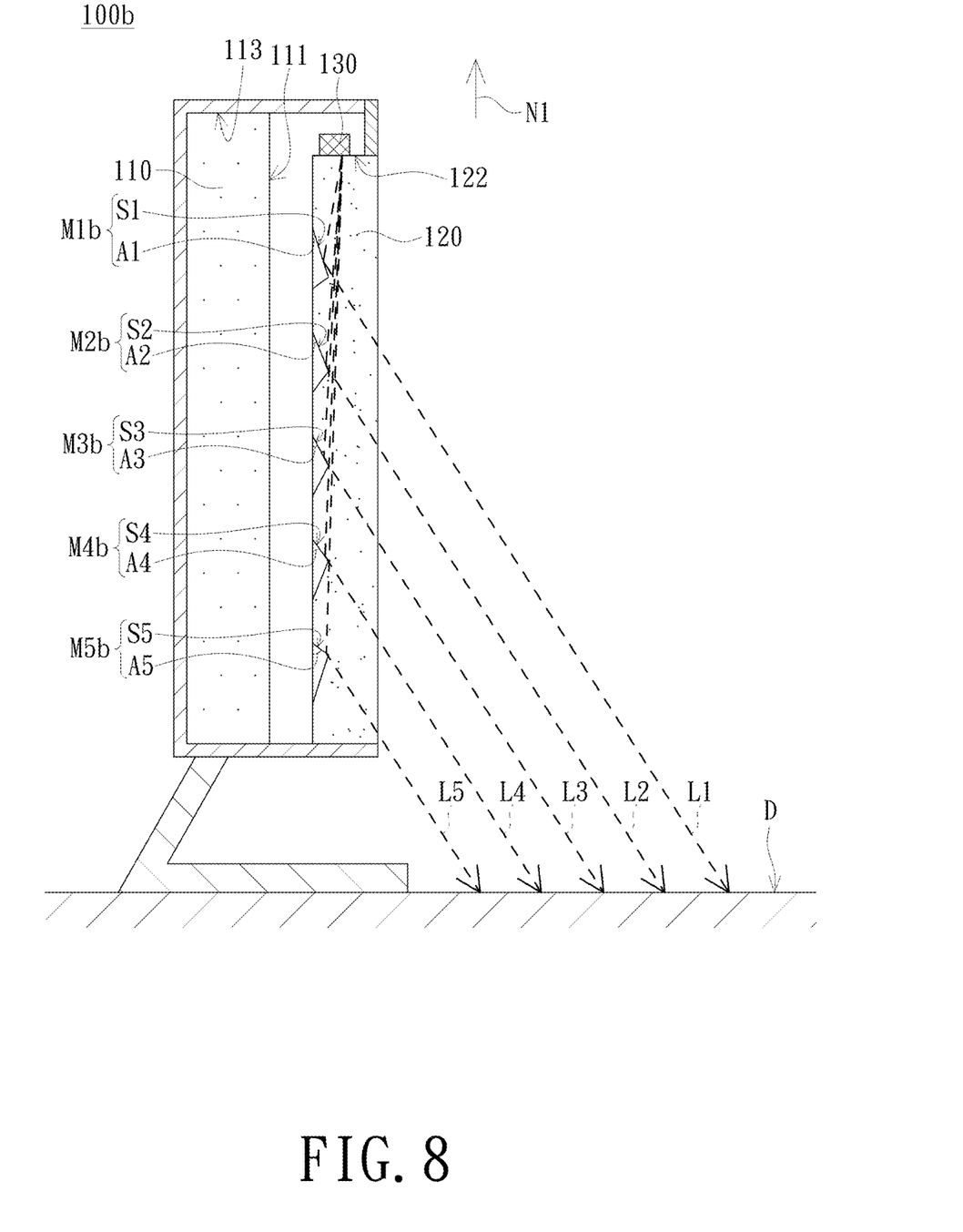
FIG. 8 is a schematic cross-sectional diagram of a display device according to another embodiment of the present invention.

FIG. 8 is a schematic cross-sectional diagram of a display device according to another embodiment of the present invention. The structures and advantages of the display device 100b are similar to those of the embodiment shown in FIG. 1, and only the difference is described as follows. Please refer to FIG. 8. The degrees of the included angles A1, A2, A3, A4, and A5 can be decreased in a normal direction N1 of the light-incident surface 122, and the included angle A1 adjacent to the light-incident surface 122 can be smaller than the included angle A5 away from the light-incident surface 122. Therefore, the distances of transmitting paths of the light L1, L2, L3, L4, and L5 from the light-incident surface 122 to the desktop D via each of the optical surfaces S1, S2, S3, S4, and S5 can be more similar to each other, thereby more uniformly illuminating the desktop D. Specifically, the included angle A1 of the optical microstructure M1b closest to the light-incident surface 122 can be the smallest one in all the included angles A1, A2, A3, A4, and A5 of the optical microstructures M1b, M2b, M3b, M4b, and M5b. Also, the included angle A5 of the optical microstructure M5b furthest from the light-incident surface 122 can be the largest one in all the included angles A1, A2, A3, A4, and A5 of the optical microstructures M1b, M2b, M3b, M4b, and M5b. Incidentally, the degree of each of the included angles A1, A2, A3, A4, and A5 can be adjusted by the relationship (1) first, and then further be adjusted based on the distance between the user and the display side 111 and the height between the first side 113 and the desktop D. It is understood that the degree of each of the included angles A1, A2, A3, A4, and A5 is not limited by the invention, and the quantity of the optical microstructures is not limited by the invention.

Figure 9:
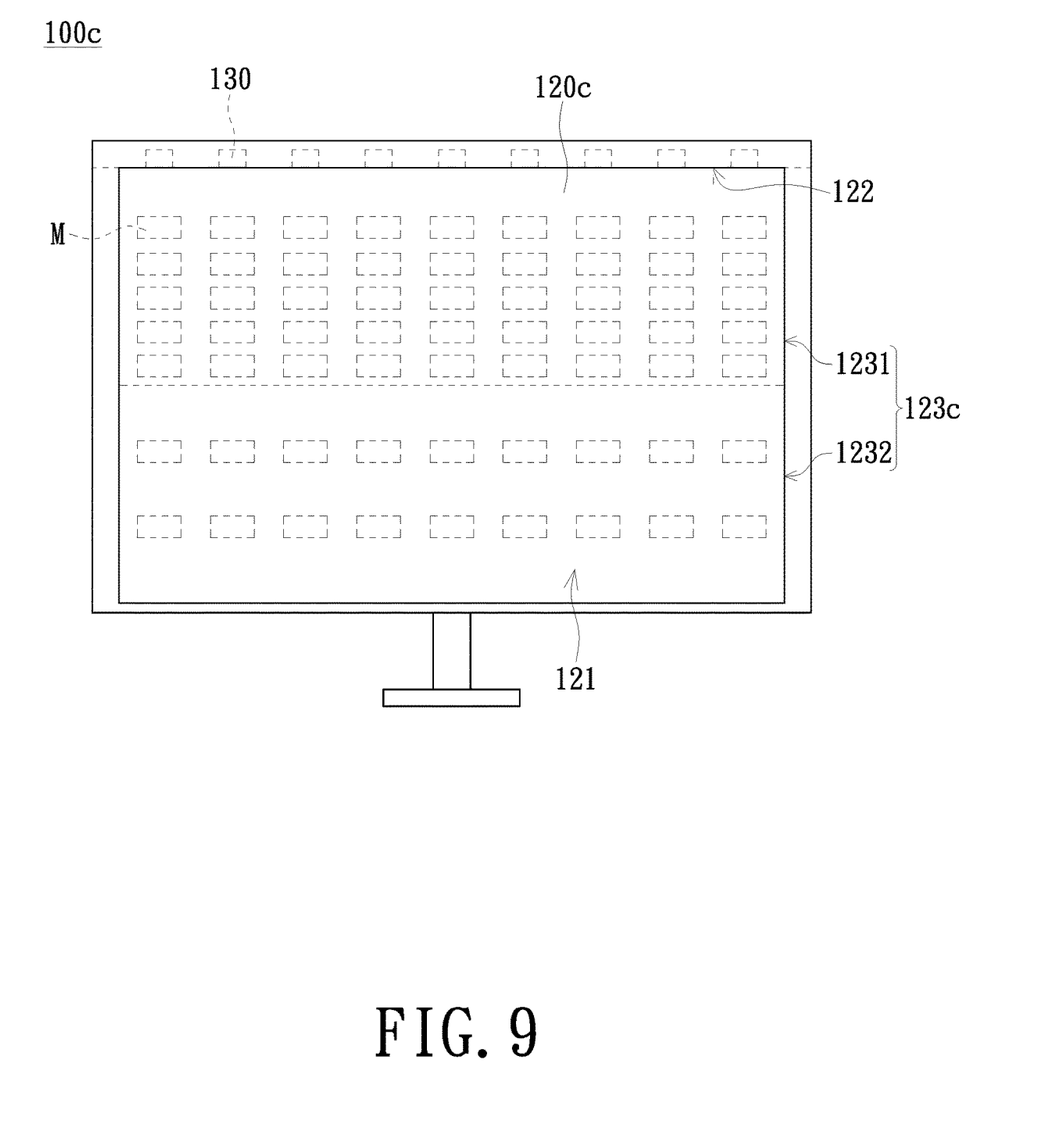
FIG. 9 is a schematic diagram of a display side of a display element of a display device according to another embodiment of the present invention.
Figure 10:
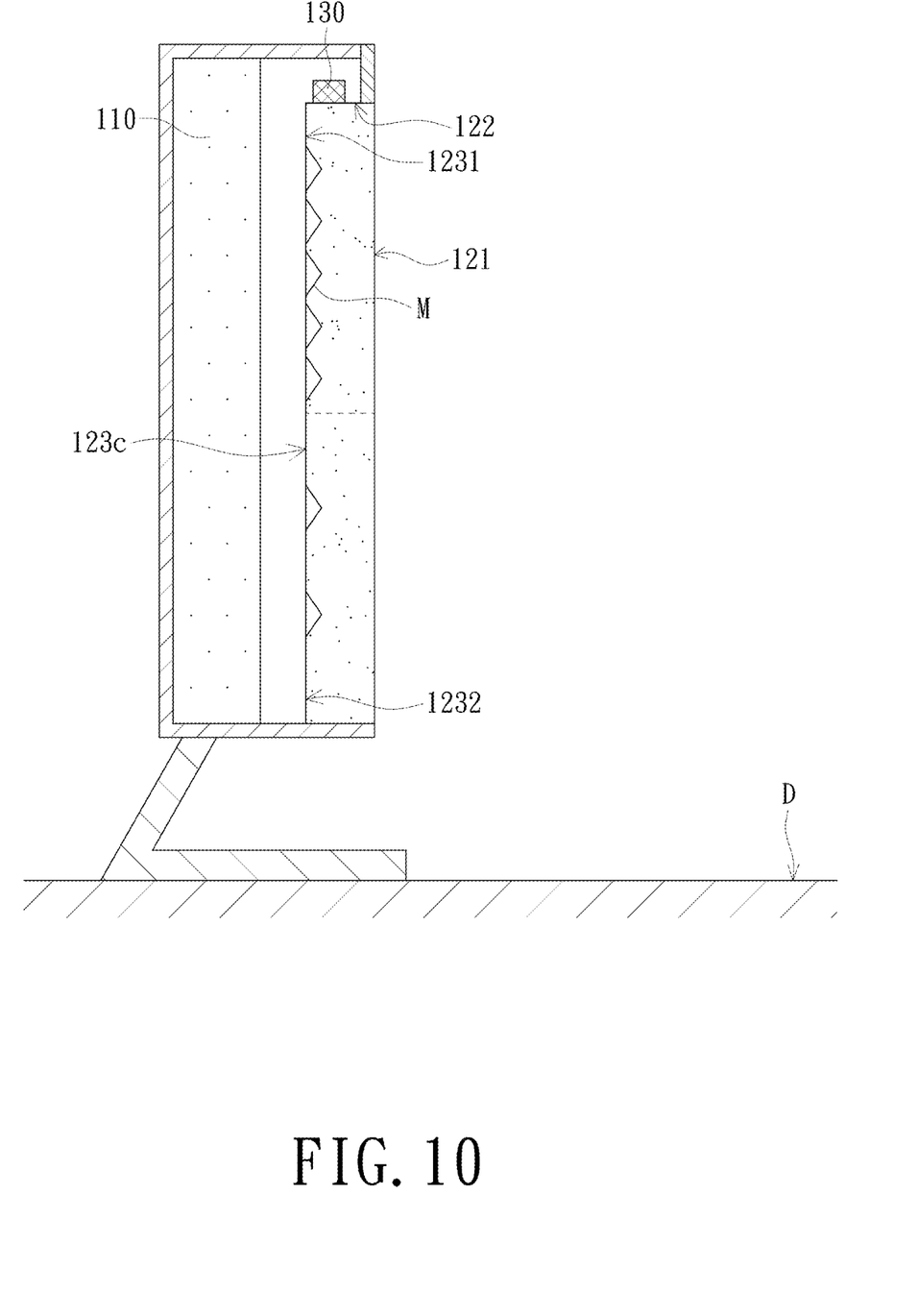
FIG. 10 is a schematic cross-sectional diagram of the display device shown in FIG. 9 of the present invention.

FIG. 9 is a schematic diagram of a display side of a display element of a display device according to another embodiment of the present invention. FIG. 10 is a schematic cross-sectional diagram of the display device shown in FIG. 9 of the present invention. The structures and advantages of the display device 100c are similar to those of the embodiment shown in FIG. 1, and only the difference is described as follows. Please refer to FIGS. 9 and 10. The surface 123c has, for example, a first area 1231 and a second area 1232. The first area 1231 is adjoined to the light-incident surface 122, and the second area 1232 is separated from the light-incident surface 122 by the first area 1231. A quantity of the optical microstructures M of the first area 1231 can be greater than a quantity of the optical microstructures M of the second area 1232. As a result, the brightness of the light emitted from the light-emitting surface 121 can be more uniform, thereby making the light reaching the desktop D more uniformly. Particularly, a density of the optical microstructures M in the first area 1231 can be greater than a density of the optical microstructures M in the second area 1232. In other words, a quantity of the optical microstructures M in a unit area of the first area 1231 can be greater than a quantity of the optical microstructures M in the unit area of the second area 1232. Incidentally, a total area of the first area 1231 and a total area of the second area 1232 may be similar to each other in the embodiment, but the invention is not limited thereto.

Figure 11:
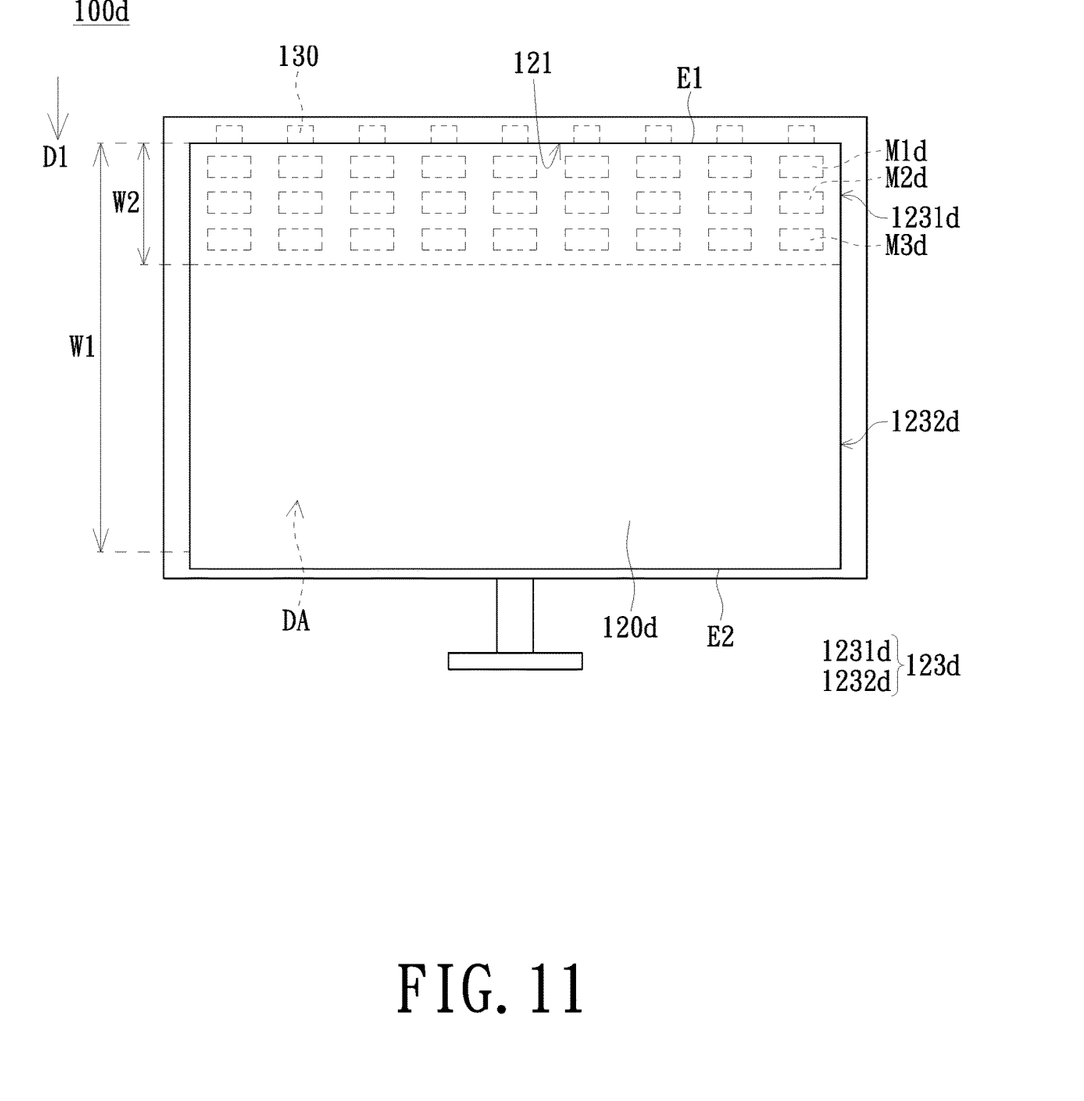
FIG. 11 is a schematic diagram of a display side of a display element of a display device according to another embodiment of the present invention.
Figure 12:
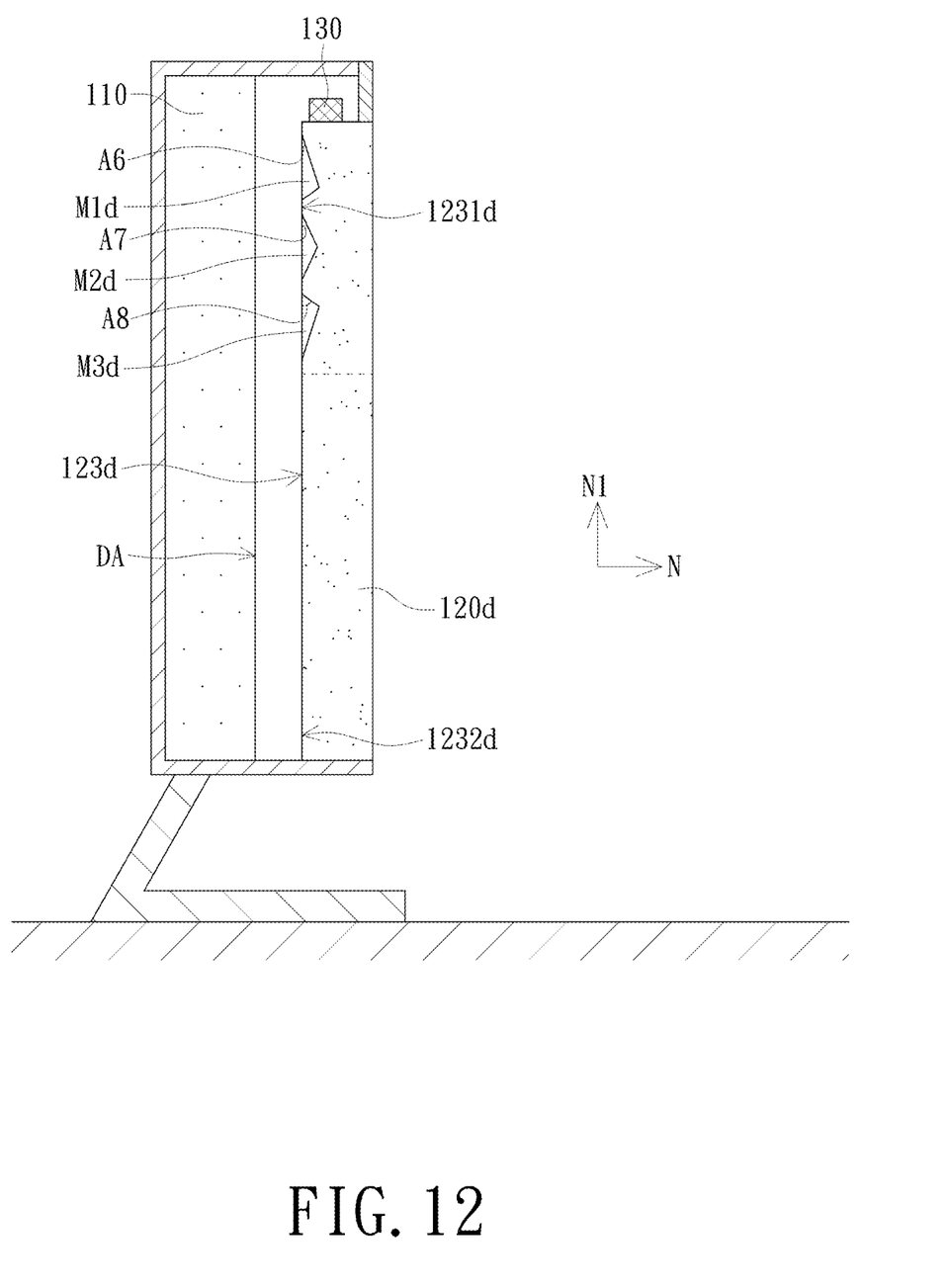
FIG. 12 is a schematic cross-sectional diagram of the display device shown in FIG. 11 of the present invention.

FIG. 11 is a schematic diagram of a display side of a display element of a display device according to another embodiment of the present invention. FIG. 12 is a schematic cross-sectional diagram of the display device shown in FIG. 11 of the present invention. The structures and advantages of the display device 100d are similar to those of the embodiment shown in FIG. 9, and only the difference is described as follows. Please refer to FIGS. 11 and 12. The optical microstructures M1d, M2d, and M3d are located, for example, only in the first area 1231d of the surface 123d. In other words, an area of the display area DA overlapped with the optical microstructures M1d, M2d, and M3d in the normal direction N can be reduced. In this way, there is more light emitted by the display area DA without passing through the optical microstructures M1d, M2d, and M3d during passing through the light guide plate 120d, thereby improving the image quality of the display device 100d. Incidentally, degrees of the included angles A6, A7, and A8 can be decreased in the normal direction N1, in other words, included angle A6 has the smallest angle, and included angle A8 has the largest angle. However, the degrees of the included angles A6, A7, and A8 may be the same as each other in one embodiment.

Please refer to FIG. 11 continuously. The first edge E1 is closer to the light-incident surface 121 than the second edge E2. A width of the display area in a direction D1 pointing to the second edge from the first edge is W1. A width of the first area 1231d in the direction D1 is W2, and W1/8≤W2≤W1/4 in one embodiment. In other words, a total area of the first area 1231d can be smaller than a total area of the second area 1232d. It is understood that the width W2 may be changed in the range based on the needs in practice, so the invention is not limited thereto.

Figure 13:
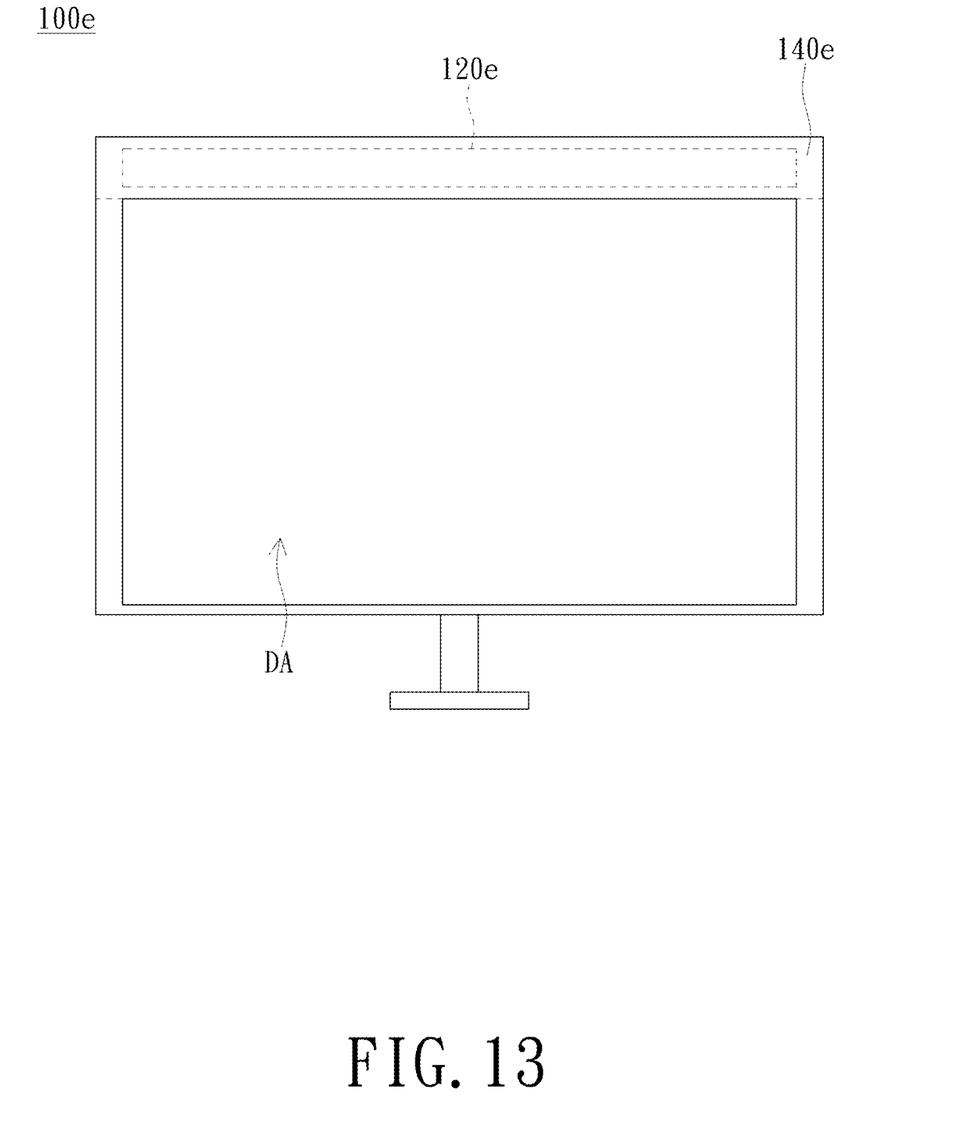
FIG. 13 is a schematic diagram of a display side of a display element of a display device according to another embodiment of the present invention.
Figure 14:
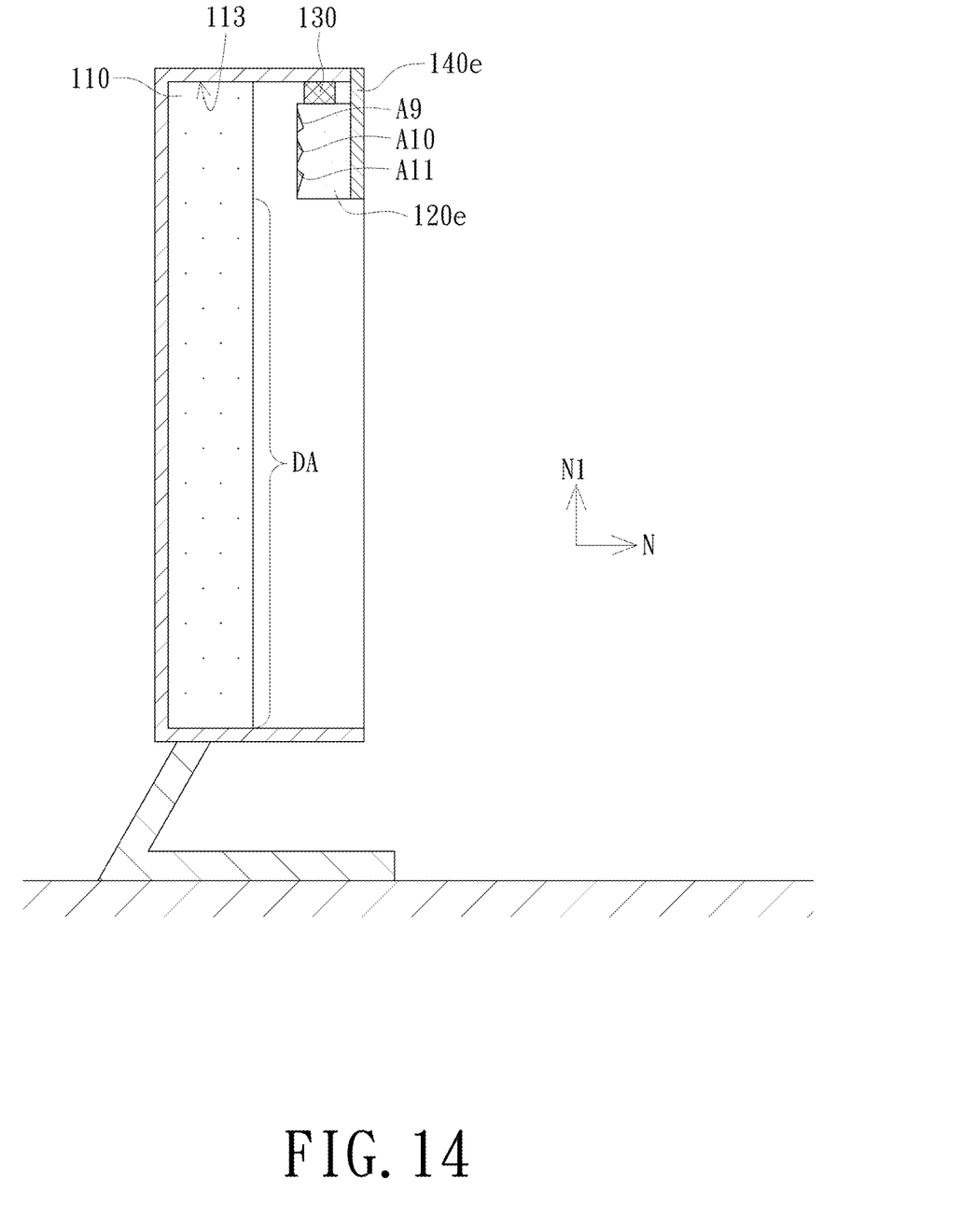
FIG. 14 is a schematic cross-sectional diagram of the display device shown in FIG. 13 of the present invention.

FIG. 13 is a schematic diagram of a display side of a display element of a display device according to another embodiment of the present invention. FIG. 14 is a schematic cross-sectional diagram of the display device shown in FIG. 13 of the present invention. The structures and advantages of the display device 100e are similar to those of the embodiment shown in FIG. 1, and only the difference is described as follows. Please refer to FIGS. 13 and 14, the light guide plate 120e is adjacent to the first side 113. The display area DA is not covered by the light guide plate 120e, and the light guide plate 120e can be covered by the light-shading element 140e. In other words, the light guide plate 120e is overlapped with and blocked by the light-shading element 140e in the normal direction N, so that the light guide plate 120e can be hidden behind the light-shading element 140e. Also, the display area DA is exposed from the light-shading element 140e in the normal direction N. As a result, the light emitted by the display area DA can be transmitted to the user without passing through the light guide plate 120e, thereby further improving the image quality of the display device 100e. Incidentally, degrees of the included angles A9, A10, and A11 can be decreased in the normal direction N1, in other words, included angle A9 has the smallest angle, and included angle A11 has the largest angle. However, the degrees of the included angles A9, A10, and A11 may be the same as each other in one embodiment.

In summary, in display device of the invention, the light guide plate has the optical microstructures, and the light emitted by the light-emitting element is reflected by the optical microstructures, so the light can be emitted from the light-emitting surface in a diagonally-downward direction away from a normal direction of the light-emitting surface. Hence, before reaching the desktop, the light has been reflected at least one time by the optical microstructures, so the brightness of the light reflected to the eyes of the user can be reduced, thereby reducing the problem of glare. Furthermore, by reflecting the light through the optical microstructure, the light can be prevented from directly entering the eyes of the user, and the light can be guided to the appropriate position. Also, because the light-emitting element is able to be electrically connected to the display element without a wire, and the display device is able to illuminate the desktop without requiring an additional computer monitor lamp, the display device of the invention can have a simple structure. For these reasons, the display device of the invention is able to illuminate the desktop as a computer monitor lamp does with a simpler structure, and also able to reduce the problem of glare.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
    a display element, having a display side and a back side, and the display side being opposite to the back side;
    a light guide plate, disposed on the display side, the light guide plate having a light-emitting surface, a light-incident surface, and a surface, the light-emitting surface facing away from the display side, the surface facing toward and being closest to the display side, the surface having a plurality of optical microstructures, and the light-incident surface being located between the light-emitting surface and the surface; and
    a light-emitting element, disposed opposite to the light-incident surface.

2. The display device according to claim 1, wherein the display side has a display area, the display area is covered by the light guide plate, the surface faces to the display area, the display area has a first edge, a second edge, a third edge, and a fourth edge, the first edge is opposite to the second edge, the third edge and the fourth edge are located between the first edge and the second edge, the third edge is opposite to the fourth edge, a distribution area of the optical microstructures on the surface extends from the first edge to the second edge, and the distribution area further extends from the third edge to the fourth edge.

3. The display device according to claim 2, wherein the surface has a first area and a second area, the first area is adjoined to the light-incident surface, the second area is separated from the light-incident surface by the first area, a quantity of the optical microstructures of the first area is greater than a quantity of the optical microstructures of the second area.

4. The display device according to claim 1, wherein the optical microstructures are recessed from the surface, each of the optical microstructures has an optical surface and an included angle, the optical surfaces face toward the light-incident surface, each of the included angles is formed between the surface and respective the optical surface.

5. The display device according to claim 4, wherein each of the included angles has the same degree.

6. The display device according to claim 4, wherein degrees of the included angles are decreased in a normal direction of the light-incident surface, and the included angles adjacent to the light-incident surface are smaller than the included angles away from the light-incident surface.

7. The display device according to claim 4, wherein each of the optical surfaces comprises a flat surface or a curved surface.

8. The display device according to claim 1, wherein a shape of each of the optical microstructures is in a crescent shape or in a shape of a triangular prism.

9. The display device according to claim 1, wherein the display side has a display area, the display area is covered by the light guide plate, the surface faces to the display area, the surface has a first area and a second area, the first area is adjoined to the light-incident surface, and the second area is separated from the light-incident surface by the first area, the optical microstructures are located only in the first area.

10. The display device according to claim 9, wherein the display area has a first edge and a second edge, the first edge is opposite to the second edge, the first edge is closer to the light-incident surface than the second edge, a width of the display area in a direction pointing to the second edge from the first edge is W1, a width of the first area in the direction is W2, and W1/8≤W2≤W1/4.

11. A display device, comprising:
    a display element, having a display side and a back side, and the display side being opposite to the back side;
    a light guide plate, disposed on the display side, the light quide plate having a light-emitting surface, a light-incident surface, and a surface, the light-emitting surface facing away from the display side, the surface facing toward the display side, the surface having a plurality of optical microstructures, and the light-incident surface being located between the light-emitting surface and the surface; and
    a light-emitting element, disposed opposite to the light-incident surface;
    wherein the display device further comprises a light-shading element, the display element further has a first side and a second side, the first side and the second side are opposite to each other, the display side and the back side are located between the first side and the second side, the light-shading element is disposed on the display side, the light-shading element is closer to the first side than the second side, a display area of the display side is located between the light-shading element and the second side, the light-emitting element is disposed between the light guide plate and the first side, and the light-emitting element is covered by the light-shading element.

12. The display device according to claim 11, wherein the light guide plate is adjacent to the first side, the display area is not covered by the light guide plate, and the light guide plate is covered by the light-shading element.

13. The display device according to claim 1, wherein a normal line of the light-incident surface is parallel to a direction of gravity.

* * * * *